Aug. 23, 1966  E. R. MARK  3,267,539
CABLE FITTING
Filed June 30, 1964
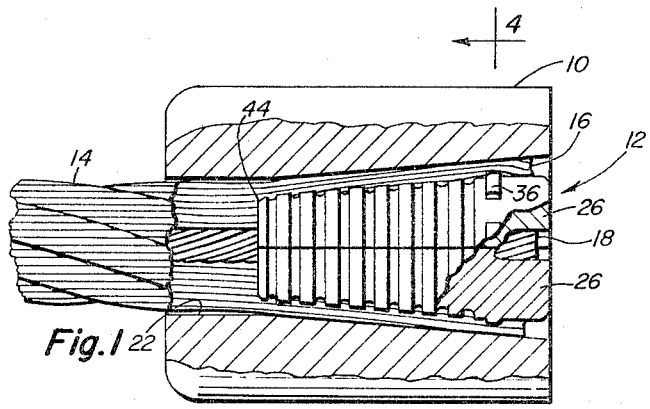
Fig.1
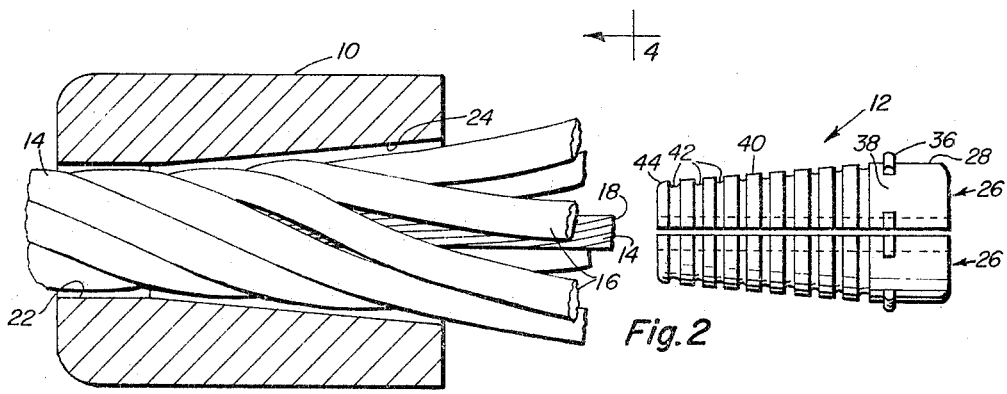
Fig.2
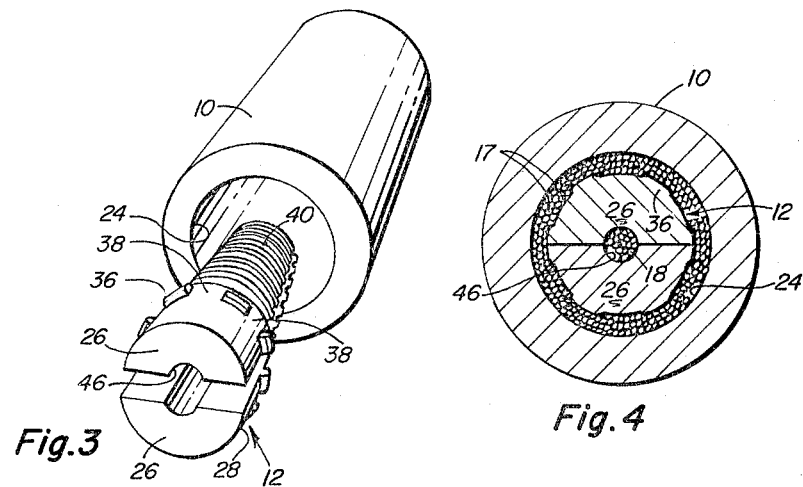
Fig.3
Fig.4
EDWARD R. MARK
INVENTOR
BY
BUCKHORN, BLORE, KLARQUIST & SPARKMAN
ATTORNEYS 3,267,539
CABLE FITTING
Edward R. Mark, 6819 NE. Broadway, Portland, Oreg.
Filed June 30, 1964, Ser. No. 379,187
5 Claims. (Cl. 24—122.6)

This invention relates to a cable fitting, and more particularly to a choker knob for a wire choker cable.

Cable fittings applied to the ends of wire cables, such as, for example, knobs for choker cables, sleeves for holding looped end portions of wire cables and the like, of the type including a wedge member embedded among the strands and pulley into a knob or ferrule, have had problems in distributing load uniformly to the many wires of a cable, and as a result the joint formed by the knob and cable has often been weaker than the rest of the cable. Also, with prior art knobs some swaging or crushing of the wire strands has occurred in securing the knobs to the cables. Another problem of prior art cable fittings has been that the corners of the fittings have cut into the cables when the latter were flexed.

An object of the invention is to provide a new and improved cable fitting.

Another object of the invention is to provide a new and improved choker knob for a wire choker cable.

A further object of the invention is to provide a wedge type cable fitting adapted to distribute load evenly to wires of a wire cable.

Yet another object of the invention is to provide a wedge type cable fitting which is easily attached to a wire cable and which uniformly spreads the wires of the cable.

A still further object of the invention is to provide a wedge type cable fitting which permits flexing of the portion of the cable adjacent the fitting without gouging the wires of the cable.

The invention provides a cable fitting including a sleeve member and a wedge-like core adapted to press the strands of wire cable against the interior of the sleeve and to hold the strands in positions distributed uniformly around the core as the core and sleeve are assembled together on the cable. Preferably the sleeve member has an opening therethrough which includes a cylindrical end bore and a frustoconical portion extending from the cylindrical end portion to the other end of the sleeve. The core or wedge is longitudinally split into a pair of members and has a bore therethrough of a diameter slightly less than that of the central wire or hemp strand of the cable to be used therewith. The wedge is complementary to the frustoconical portion of the sleeve, and preferably has an annular exterior flange at the larger end thereof having equiangularly spaced notches for receiving and holding the several exterior strands of the cable in position so as to be spread evenly as the sleeve member is moved over the wedge.

A complete understanding of the invention may be obtained from the following detailed description of a cable fitting forming a specific embodiment thereof, when read in conjunction with the appended drawings, in which:

FIG. 1 is a fragmentary, partially sectional view of a cable fitting forming one embodiment thereof;

FIG. 2 is an exploded perspective view of the cable fitting of FIG. 1;

FIG. 3 is an exploded perspective view of the cable fitting of FIG. 1; and

FIG. 4 is an enlarged, sectional view taken along line 4—4 of FIG. 1.

Referring now in detail to the drawings, the cable fitting shown therein and forming one embodiment of the invention includes a knob or sleeve 10 and a longitudinally split, tapered core or wedge 12 for use with a wire rope or cable 14 including outer strands 16 comprising a plurality of steel wires 17 and a central core or strand 18.

The strand 18 may be of metal or of other common core material such as, for example, hemp. The sleeve 10 is preferably composed of high strength manganese bronze, one suitable material being ingot #424, ASTM specifications with a tensile strength of 110,000 p.s.i. The core or wedge 12 also is preferably composed of high strength manganese bronze, one suitable material being ingot #423, ASTM specifications, with a tensile strength of 90,000 p.s.i.

The sleeve 10 has a central cylindrical bore 22 extending about one-quarter of the length thereof and preferably of a diameter about one-sixteenth of an inch greater than that of the cable 14. A frustoconical passage 24 extends from the cylindrical bore 22 to the other end of the sleeve, the angle of the wall of the passage 24 being about 4½° relative to the centerline of the sleeve.

The wedge 12 has an overall length about equal to the length of the frustoconical sleeve portion 24 and is split into two relatively slidable halves or sections 26 which define when together a short, cylindrical end portion 28 from which protrudes an annular flange 36 having a plurality of equiangularly spaced notches 38, one notch being provided for each strand 16 of the cable 14. Extending to the left of the flange 36, as viewed in FIG. 2, is a frustoconical portion 40 of the wedge complementary to the inner sleeve surface 24 but having annular grooves 42 spaced therealong to form a rough gripping surface. The small end of the wedge has a diameter about one-sixteenth of an inch less than that of the cable 14, and the end surface is preferably rounded off to form a rounded nose portion 44. The wedge is also formed with a central longitudinal bore 46 which preferably is of smaller diameter than that of the central cable strand 18 so as to clamp the same when assembled thereon.

The notches 38 extend to the surface of the portion 28. This, in effect, forms the annular flange 36 into a series of arcuate teeth which are equal in circumferential length to that of the notches 38. The external edge or periphery of the flange is rounded so that it has no sharp corners at the junctures of the sides of the flange and the external edge. The external diameter of the flange is preferably just slightly less than the diameter of the large end portion of the frustoconical passage 24 but is slightly larger in diameter than that of the portion of the passage 24 in which the flange is positioned when the wedge 12 is positioned operatively in the sleeve 10. The ends of the notches are substantially radial of the wedge. The thickness of the flange preferably is about one-sixteenth of an inch, and the height thereof is preferably about one-sixteenth of an inch.

To assemble the cable fitting on the end of the cable 14, the sleeve 10 is slid onto the cable, the end portions of the strands 16 are unwound from the central strand 18, the halves 26 of the wedge 12 are placed on the strand 18 and the strands 16 are placed in the notches 38 so that the ends of such strands are spaced from the end of the wedge as best shown in FIG. 1. The sleeve and the wedge then are moved relatively to one another so as to slide the sleeve over the strands 16 and the wedge 12 until the righthand ends of the sleeve and wedge, as viewed in FIG. 1, are substantially flush with one another. This is done with suitable mechanical devices, such as, for example, devices similar to that shown in my prior Patent 3,035,627. The strands 16 are held in spaced relation by flange 36 as telescoping of the wedge and sleeve commences. As telescoping proceeds the flange collapses and the wires are spread uniformly by the wedging action. The individual wires 17 tend to be pulled straight and to be distributed uniformly around the core without bunching or crushing. Thus a load imposed on the cable is distributed substantialy uniformly to all of the wires 17 assuring that the fitting will not, if at all, significantly weaken the cable. Since the bore 22 is larger than the cable, and the rounded wedge nose 44 extends only to the cylindrical bore, flexing of the cable is permitted without gouping the wires 17.

The wedge 12 can be furnished to the user with the right number of notches 38 for the number of strands of the cable with which the wedge is to be used. Alternately, the wedge 12 can be supplied to the user in blank form with no notches in the flange 36, and the user, with a round file, can form the desired number of notches 38 for the particular cable with which it is to be used. By the latter usage, several wedges with different numbers of notches for cables having different numbers of strands need not be kept on hand by the user. Since the flange is quite thin and malleable it offers no significant resistance to spreading of the wires of the cable uniformly around the entire circumference of the wedge.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a cable fitting,
a sleeve having a frustoconical inner portion,
and a wedge having a frustoconical outer portion and a thin, malleable, exterior flange having notches therein spaced substantialy equidistantly therearound for positioning exterior strands of a wire cable and holding the strands in positions spaced evenly apart as the wedge and sleeve are moved lengthwise relative to each other, said flange being collapsible as movement of said wedge and said sleeve proceeds, whereby the wires of the cable become uniformly spread apart around the entire circumference of said wedge and clamped between the frustoconical portions of said wedge and said sleeve.

2. In a cable fitting,
a wedge having a frustoconical portion and a plurality thin, wide, radical, malleable teeth spaced equidistantly from each other around the wedge at the larger end portion of the frustoconical portion for receiving strands of wires of a wire cable between the sides of the teeth to hold the strands in spaced positions,
and a sleeve having a frustoconical portion adapted to be moved over the wedge to collapse said teeth and clamp the wires of the strands against the frustoconical portion of the wedge.

3. In a cable fitting,
a sleeve member having a passage therethrough tapering in a frustoconical portion from a predetermined diameter near one end thereof to a lesser diameter at a point therealong intermediate the ends thereof and having a substantially cylindrical portion of said lesser diameter extending from said point to the other end thereof for receiving a wire cable of a diameter less than that of the cylindrical portion,
and a generally frustoconical wedge substantially equal in length to the length of said frustoconical portion of said passage and adapted to be positioned in said passage in the frustoconical portion thereof in clamping engagement with the wires of a wire cable and having a rounded nose portion positioned substantially at the juncture of the cylindrical portion and the frustoconical portion of the passage to permit limited flexing of the portions of the wires of the cable at said juncture.

4. In a choker knob,
a generally cylindrical knob having a passage therethrough including a cylindrical portion at one end thereof and a frustoconical portion extending from the cylindrical portion to the other end thereof,
and a wedge substantially equal in length to the length of said frustoconical portion of said passage and having a bore therethrough for receiving a core of a wire cable, said wedge having a frustoconical portion generally complementary to the frustoconical portion of the passage in the knob and a plurality of thin, wide, malleable teeth positioned at the large end of the frustoconical portion thereof and spaced equiangularly around the wedge, each adjacent pair of teeth being separated from each other a distance substantially equal to the width of each tooth to define strand-locating notches therebetween, said teeth being collapsible as said knob and said wedge are telescoped together, thereby to space the wires of said cable uniformly around the circumference of said wedge and clamp said wires between the frustoconical portions of said passage and said wedge.

5. In combination,
a wire cable having a core and a plurality of outer strands, each of said strands comprising a plurality of steel wires, and
a fitting for said wire cable, said fitting comprising:
a sleeve member having a passage therethrough including a cylindrical portion at one end thereof having a larger diameter than said cable and a frustoconical portion extending from said cylindrical portion to the other end thereof, and
a wedge located within said frustoconical portion of said sleeve passage and substantially equal in length thereto, said wedge having a bore therethrough in which said core of said wire cable is received,
said wedge having a frustoconical portion generally complementary to said frustoconical portion of said passage and being provided initially with a thin, malleable exterior flange with notches therein spaced substantially equidistantly therearound for receiving said strands prior to assembly of said wedge and sleeve, said flange being positioned at the larger end of said frustoconical portion,
said wires of said outer strands of said wire cable being spread uniformly around the circumference of said wedge and being clamped between said wedge and said frustoconical portion of said sleeve, said flange being collapsed under the wedging action of assembly of said wedge and sleeve to permit spreading of said wires uniformly about said wedge, said outer strands of said wire cable being free of said sleeve in said cylindrical portion thereof.

References Cited by the Examiner

UNITED STATES PATENTS

| | | |
|---|---|---|
| 1,758,218 | 5/1930 | Carlson. |
| 1,758,312 | 5/1930 | DeRight _____ 24—122.6 |
| 1,885,316 | 11/1932 | Astley _____ 24—122.6 X |
| 1,980,426 | 11/1934 | Noyes _____ 24—122.6 X |
| 2,016,856 | 10/1935 | Fiege _____ 24—122.6 X |
| 2,341,922 | 2/1944 | King _____ 24—122.6 |
| 2,856,662 | 10/1958 | Clark _____ 24—122.6 |
| 2,890,510 | 6/1959 | Spalding _____ 24—126 |
| 2,898,655 | 8/1959 | Van Buskirk _____ 24—122.6 X |

FOREIGN PATENTS

| | | |
|---|---|---|
| 274,675 | 7/1927 | Great Britain. |
| 950,558 | 2/1964 | Great Britain. |
| 240,888 | 5/1946 | Switzerland. |

BERNARD A. GELAK, *Primary Examiner.*